United States Patent Office 3,546,109
Patented Dec. 8, 1970

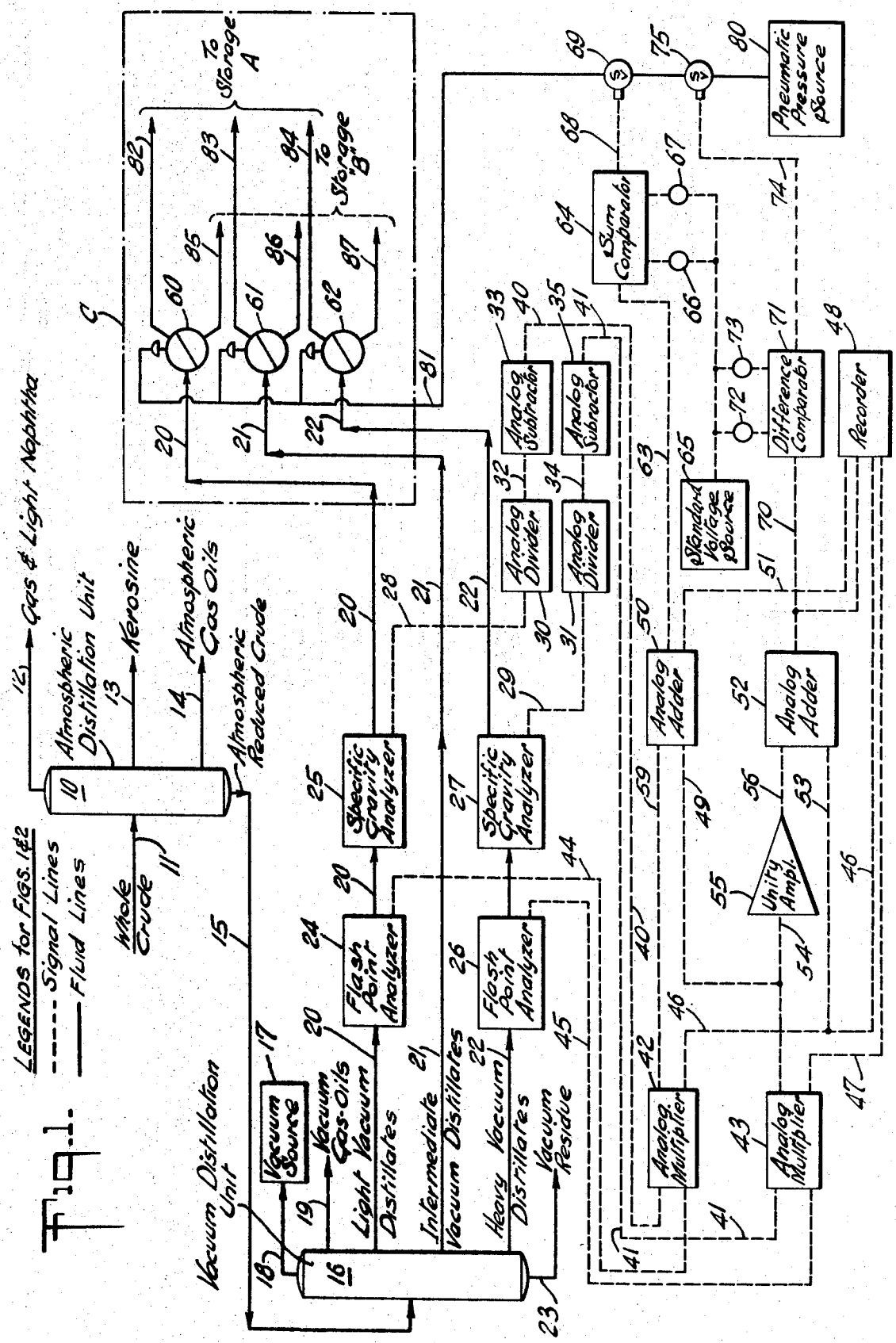

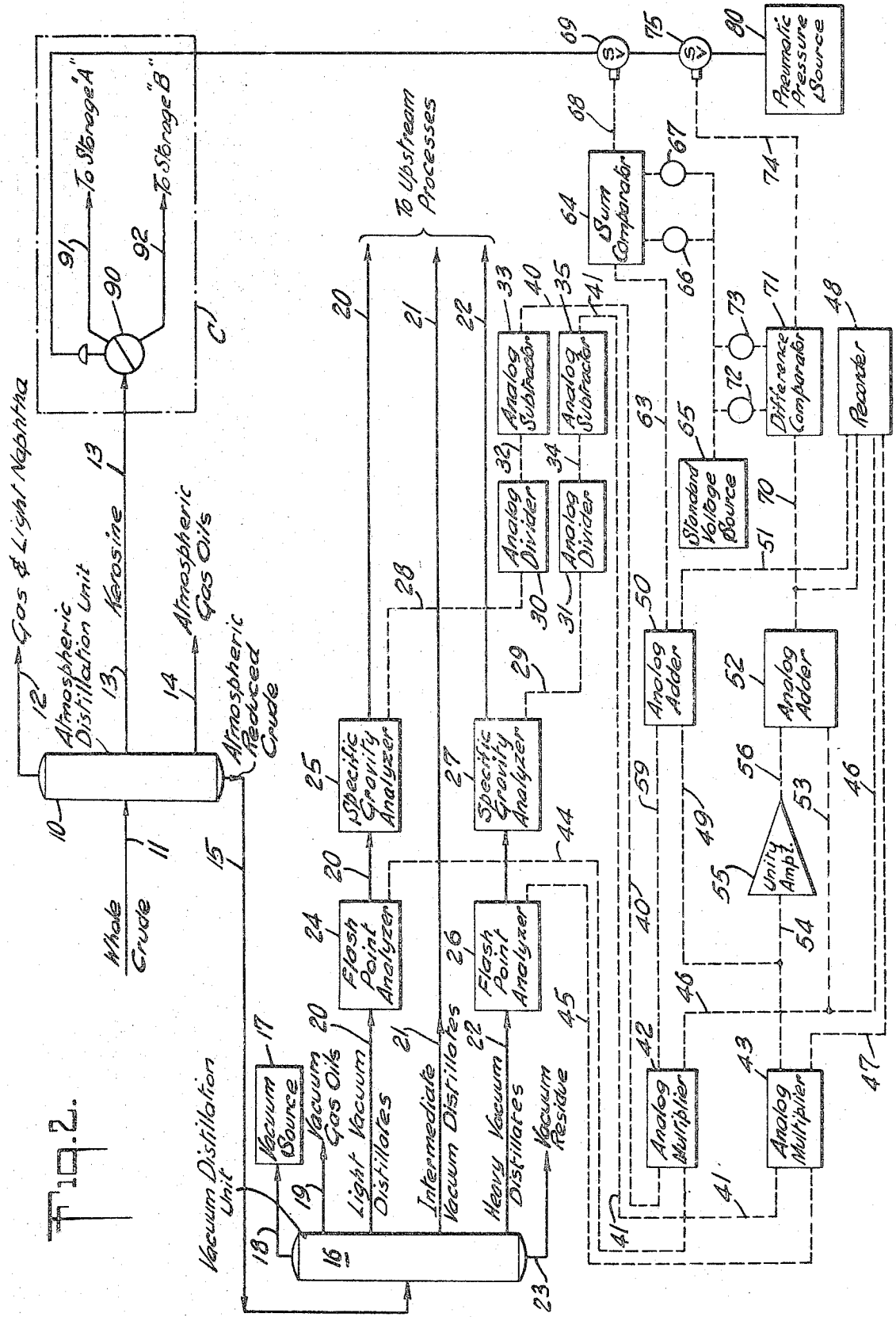

3,546,109
METHOD AND APPARATUS FOR CHARACTERIZATION OF HYDROCARBON MIXTURES
Robert A. Woodle, Nederland, Tex., assignor to Texaco Inc., New York, N.Y., a corporation of Delaware
Filed Dec. 30, 1968, Ser. No. 787,444
Int. Cl. B01d 3/42; C10g 7/00
U.S. Cl. 208—347            14 Claims

ABSTRACT OF THE DISCLOSURE

Disclosed are various methods and apparatus for the characterization of petroleum hydrocarbon mixtures based on paraffinicity being substantially synonamous to, but more simplified than, the Watson-Nelson characterization. An API gravity-flash point characterization method and apparatus is disclosed which employs on-stream measurements of flash point and specific gravity. The specific gravity measurements are converted to API gravity by applying a conversion equation, and the characterization is obtained by providing a signal corresponding to the product of API gravity and flash point. Also disclosed are methods and apparatus for improving the accuracy of the API gravity-flash point characterization by compensation for the depth of distillation between the light and heavy fractions of distillation units. The compensation is in accordance with the average and the difference of the API gravity-flash point characterization of the light and heavy distillation fractions. Also disclosed are methods and apparatus for segregating the distillates for selected up-stream processing based on the aforementioned compensated characterization.

BACKGROUND OF THE INVENTION

This invention relates to methods and apparatus for the characterization of hydrocarbon mixtures in accordance with the relative paraffinicity thereof and more particularly for the characterization and segregation of petroleum hydrocarbon mixtures in accordance with an index of the relative paraffinicity of the mixtures similar to the Watson-Nelson characterization factor.

Various methods of characterizing petroleum hydrocarbon mixtures representative of their chemical make-up have been proposed in the past. One such method is the well known Watson-Nelson characterization which provides a numerical quantity known as a characterization factor representative of the relative paraffinicity of the hydrocarbon mixture. That is, on a relative basis, the factor approximately corresponds to the amount of normal and non-normal paraffins, and saturates, in the petroleum crude or fraction for which the factor is ascertained. This characterization method has found considerable use in the petroleum refining industry as an aid in determining the best operating conditions of the refining equipment for optimum process performance. It can also be used to identify the most suitable petroleum fractions to be used in the preparation of selected products. A major drawback of the Watson-Nelson characterization method is that for its determination it entails a rather tedious and time consuming laboratory procedure, and there is no instrument for its direct measurement which is suitable for on-stream use. Providing a capability of rapid on-stream characterization of a petroleum crude or its fractions is of great importance in connection with automatic or computer control of refining installations whereby the operating conditions of down-stream processing units can be automatically adjusted in anticipation of changes in feed quality, thus reducing the product off-test period inherent in any change in feed quality.

In an article appearing in the August 1964 issue of "Hydrocarbon Processing and Petroleum Refiner," vol. 43, No. 8, on pages 149 through 152, I described a scheme for characterizing various petroleum crudes based on measurements of the API gravity and the Cleveland Open Cup flash point of the crudes. The characterization scheme I proposed provided excellent correlations with the Watson-Nelson characterizations. In subsequent studies I have learned that the correlation between the gravity-flash point characterization and the Watson-Nelson characterization departs from a linear relationship with reasonably high depths of distillation between petroleum fractions. Also, for on-stream use the gravity-flash point characterization introduces the further problem of providing an on-stream measurement of the API gravity.

In accordance with the invention as herein disclosed I have provided the capability for on-stream characterization useable in petroleum refining processes which makes use of readily available measuring instruments and which tends to compensate for variations of characterization with depth of distillation. Hence, the invention may be applied in conjunction with automatic or computer control of petroleum refining processes resulting in improved product quality and economy.

SUMMARY

Briefly stated, in accordance with one aspect of the invention there is provided a simplified method for characterizing a hydrocarbon mixture by providing a signal representative of the paraffinicity of the mixture, i.e., by providing a signal corresponding to the API gravity-flash point product characteristic of the mixture. The method includes sensing a physical property of the mixture representative of its flash point and providing a first signal corresponding thereto, and sensing a physical property of the mixture representative of its specific gravity and providing a second signal corresponding thereto. The method further includes generating a third signal corresponding to the API gravity of the mixture by generating the third signal in response to the second signal and in accordance with a conversion equation relating specific gravity with API gravity, and generating a fourth signal corresponding to the product of the first and third signals whereby the fourth signal corresponds to the API gravity-flash point product characteristic of the mixture, the fourth signal being representative of the paraffinicity of the mixture.

In another version thereof, the invention is adapted to provide an API gravity-flash point product characterization, of improved accuracy, of a hydrocarbon mixture subjected to a distillation process wherein the process provides a first distilled fraction and a second distilled fraction heavier than the first. In accordance with the method of this aspect of the invention the aforementioned steps are performed with respect to the first distilled fraction, providing a fourth signal corresponding to the API gravity-flash point product of the first fraction, and the aforementioned steps are performed with respect to the second distilled fraction providing a seventh signal corresponding to the API gravity-flash point product of the second fraction. This method includes the further step of generating an eighth signal representative of the average of the fourth and seventh signals, the eighth signal being a characterization of improved accuracy of the paraffinicity of the hydrocarbon mixture tending to compensate for variations of paraffinicity with depth of distillation between the first and second fractions. In another version of the latter-mentioned aspect the further step is added of segregating at least one of the distilled fractions when the average paraffinicity eighth signal is between upper and lower predetermined values.

In yet another aspect of the invention, wherein the distillation process includes atmospheric and vacuum distillation processes, the aforementioned fourth, seventh, and eighth signals are generated with respect to first and second vacuum distilled fractions, and the further step is included of generating a paraffinicity difference tenth signal corresponding to the difference between the fourth and seventh signals. The difference tenth signal is thereby representative of the paraffinicity difference between the first and second vacuum distilled fractions. Taken together, the average paraffinicity eighth and the paraffinicity difference tenth signals are a more complete characterization of the petroleum stock processed than either signal alone. In separate versions of the invention the respective products of the atmospheric distillation process and the vacuum distillation process are segregated in response to both the eighth and tenth signals when these signals are within predetermined limits, the segregation being, for example, for the respective manufacture of jet engine fuel and inhibited turbine lubrication oil.

In accordance with another aspect of the invention there is provided apparatus in novel combination for characterizing a hydrocarbon mixture including means, such as a flash point analyzer, for providing a first signal corresponding to the flash point of the mixture, and means, such as a specific gravity analyzer, for providing a second signal corresponding to the specific gravity of the mixture. The apparatus also includes a special purpose computer responsive to the second signal for providing a third signal corresponding to the API gravity of the mixture in accordance with an equation relating API gravity with specific gravity. The computer is also adapted to provide a fourth signal corresponding to the product of the first and third signals, whereby the fourth signal corresponds to API gravity-flash point characterization of the hydrocarbon mixture. In a further embodiment of the apparatus for characterizing a hydrocarbon mixture subjected to a distillation process resulting in at least two fractions of the mixture, the apparatus in combination includes the aforementioned provisions for generating a fourth signal corresponding to API gravity-flash point characterization of a first fraction of the mixture. The apparatus further includes similar provisions for generating fifth and sixth signals corresponding, respectively, to the flash point and the API gravity of a second fraction of the mixture. In this embodiment the computer also includes provisions for generating a seventh signal corresponding to the API gravity-flash point characterization of the second fraction and further includes means, such as a summing amplifier, for providing an eighth signal corresponding to the average of the fourth and seventh signals whereby the eighth signal corresponds to the average API gravity-flash point characterization of the first and second fractions of the hydrocarbon mixture. The eighth signal thus generated corresponds to a paraffinicity characterization of improved accuracy of the hydrocarbon mixture processed.

In still further embodiments of the apparatus the computer includes difference measuring means, such as a unity gain polarity reversing amplifier in conjunction with a summary amplifier, for providing a tenth signal corresponding to the difference between the fourth and seventh signals, namely, corresponding to the difference in the paraffinicity characterization factor of the first and second fractions. Also included are segregating means, responsive to the eighth and tenth signals, such as a valve controller and suitable by-pass valves for segregating the products of a vacuum distillation tower in one embodiment, and for segregating the products of an atmospheric distillation tower in another embodiment.

In view of the foregoing it is an object of the invention to provide a simplified and improved method for the characterization of hydrocarbon mixtures.

Another object of the invention is to provide a method for the paraffinicity characterization of hydrocarbon mixtures substantially synonymous with the Watson-Nelson characterization, but simpler in use.

Another object of the invention is to provide an improved method for the gravity-flash point product paraffinicity characterization of hydrocarbon mixtures.

Another object of the invention is to provide a method for the gravity-flash point product paraffinicity characterization of hydrocarbon mixtures of improved accuracy suitable for on-stream use.

Another object of the invention is to provide a method for segregating the products of distillation processes in accordance with the gravity-flash point product paraffinicity characterization of the processed hydrocarbons.

Another object of the invention is to provide embodiments of apparatus to fulfill the aforementioned objectives.

These and other objects, advantages and features of the invention, will be more fully understood by referring to the following description and claims, taken in conjunction with the accompanying drawings.

BRIEF DESCRIPTION OF THE DRAWINGS

FIG. 1 is a schematic block diagram illustrating the invention adapted to provide a parafinicity characterization of a petroleum crude subjected to atmospheric and vacuum distillation processes and illustrating the invention in use for segregating the products of the vacuum distillation process in response to the characterization.

FIG. 2 is a schematic block diagram illustrating the invention adapted to provide the aforementioned paraffinicity characterization and illustrating the invention in use for segregating a product of the atmospheric distillation ity characterization of the processed hydrocarbons.

DESCRIPTION OF THE PREFERRED EMBODIMENTS

Referring now to FIG. 1 there is schematically shown an atmospheric distillation unit 10 to which is carried a stream of whole petroleum crude for distillation from a source not shown. The atmospheric distillation unit includes conventional atmospheric distillation equipment which for the purpose of simplicity is illustrated as a single tower. The whole crude enters the atmospheric distillation unit through a conduit 11. The light atmospheric distilled fractions, i.e., the fraction such as a gas and light naphtha which have relatively low boiling points are schematically shown being withdrawn overhead from the atmospheric distillation unit 10 through a conduit 12. The heavier atmospheric fractions having relatively higher boiling points such as kerosene and atmospheric gas oils are shown being withdrawn from the intermediate and lower stages of the atmospheric distillation unit through conduits 13 and 14, respectively. The atmospheric residue also known as atmospheric reduced crude is removed from the bottom of the atmospheric distillation unit through a conduit 15 which carries the atmospheric reduced crude to a vacuum distillation unit 16 for further distillation. The vacuum distillation unit 16 includes conventional vacuum distillation equipment and for the purpose of simplicity is illustrated as a single tower. A vacuum source 17 such as a vacuum jet for providing a suitable vacuum in the vacuum distillation unit is shown connected with the upper portion thereof by a conduit 18. The vacuum gas oils and the light vacuum distillates are removed from the upper stages of the vacuum distillation unit through conduits 19 and 20, respectively. The intermediate and heavy vacuum distillates are removed from the intermediate and lower stages of the vacuum distillation unit through conduits 21 and 22, respectively. The heaviest vacuum fraction, the vacuum residue, is withdrawn from the bottom of the vacuum distillation unit through a conduit 23.

In order to sense the Cleveland Open Cup flash point of the light vacuum distillates, there is provided a flash point analyzer 24 which is connected to the conduit 20 to receive a small stream of the light vacuum distillates which after passing through the flash point analyzer is returned to the conduit 20. The flash point analyzer 24 provides an electrical signal corresponding to the Cleveland Open Cup flash point of the light vacuum distillates. A suitable flash point analyzer which can be used is that manufactured by Precision Scientific Company, for example, one similar to that identified by their catalog number 74,612.

For sensing the specific gravity of the light vacuum distillates there is also connected to the conduit 20 a specific gravity analyzer 25 which receives a small sample stream of the light vacuum distillates which after passing through the specific gravity analyzer 25 is returned to the conduit 20. The specific gravity anlyzer 25 provides an electrical signal proportional to the specific gravity of the light vacuum distillates. A suitable specific gravity analyzer which can be used is that manufactured by Automatic Products, Inc., under the trade designation Dynatrol CL–10RV series. For sensing the Cleveland Open Cup flash point and the specific gravity of the heavy vacuum distillates a second flash point analyzer 26 and a second specific gravity analyzer 27 are provided which are as described above and which are coupled to the conduit 22 which carries the heavy vacuum distillates. The use of specific gravity analyzers is preferred since such an analyzer is readily available in the art and since the specific gravity signal can be converted to API gravity signals using relatively simple computing elements. The API gravity is related to the specific gravity in accordance with the following equation:

$$°API = \frac{C_1}{S_g} - C_2$$

where:

$S_g$ = specific gravity
$C_1$ = a constant having a value of about 141.5, and
$C_2$ = a constant having a value of about 131.5.

To perform the conversion, the specific gravity signals from the analyzers 25 and 27, are carried by suitable signal carrying conduits, 28 and 29, to analog division devices 30 and 31, respectively. The latter devices include conventional analog division components for dividing the above constant $C_1$ by their respective input specific gravity signals, and for providing corresponding output quotient signals. The output quotient signal from the analog division device 30 is carried by a conduit 32 to a conventional analog substraction device 33 which subtracts from the quotient signal the above constant $C_2$ and provides an output signal corresponding to this difference. The quotient signal from the analog division device 31 is carried by a conduit 34 to a similar analog subtraction device 35 which provides an output signal corresponding to its input quotient signal reduced by the above constant $C_2$. Hence, the output signals of the analog subtraction devices 33 and 35 correspond to the API gravity of the light vacuum distillates and the heavy vacuum distillates respectively.

The API gravity signal from the analog subtraction devices, 33 and 35, are respectively carried by conduits 40 and 41, to conventional analog multiplication devices 42 and 43. Also, the latter devices respectively receive the light and heavy vacuum distillate flash point signals from the analyzers 24 and 26, which are respectively carried thereto by conduits 44 and 45. The analog multiplication devices, 42 and 43, provide output signals corresponding to the products of their respective input signals. Hence, the output signal provided by the analog multiplication device 42 corresponds to the product of the API gravity and the Cleveland Open Cup flash point of the light vacuum distillates. Likewise, the output signal of the analog multiplication device 43 corresponds to the product of the API gravity and the Cleveland Open Cup flash point of the heavy vacuum distillates.

These signals are respectively carried by conduits 46, and 47, to a multiple pen chart recorder 48, where they are recorded and can be concurrently observed by the process operator.

To provide a signal representative of the average of the gravity-flash point characterization of the light and heavy vacuum distillates the signals from the multiplication devices 42 and 43, are also carried by conduits 59 and 49, respectively, to a conventional analog addition device 50 which provides an output signal corresponding to the sum of its two input signals. It can be seen that this sum signal is always proportional to the average of the two gravity-flash point product signals being greater than the true numeric average merely by a factor of two. Hence, the output signal of the analog addition device 50 can be interpreted as the average gravity-flash point characterization of the light and heavy vacuum distillates. This average value signal is a good paraffinicity characterization factor of all the vacuum distillates since any variation thereof with the depth of distillation tends to be eliminated by the averaging step, that is, the addition provided by the analog addition device 50. Furthermore, I have found that the average gravity-flash point product signal is also a good paraffinicity characterization of the atmospheric distilled fractions of many petroleum crudes such as, for example, Gulf Coast, West Texas, and Pennsylvania crudes. The average gravity-flash point product signal from the analog addition device 50 is carried by a conduit 51 to the chart recorder 48 where it is recorded and can be concurrently observed.

To provide a signal corresponding to the difference of the gravity-flash point product characterizations of the light and heavy vacuum distillates, the characterization signal of the light vacuum distillates provided by the analog multiplication device 42 is also carried to an analog addition device 52 by a conduit 53. The characterization signal of the heavy vacuum distillates provided by the analog multiplication device 43 is also carried by a conduit 54 to a unity gain amplifier 55 which provides an output signal equal in magnitude to its input signal but opposite in polarity. This signal representing the negative of the gravity-flash characterization of the heavy vacuum distillates is carried by a conduit 56 to the analog addition device 52, which adds the latter reversed signal to the light vacuum distillates characterization signal and provides an output signal corresponding to this sum. Hence, the output signal of the analog addition device 52 corresponds to the difference between the gravity-flash point characterizations of the light and heavy vacuum distillates. This difference signal is carried by a conduit 57 to the chart recorder 48 where it is recorded and can be concurrently observed. This difference signal represents the degree of change which occurs as a consequence of the depth of distillation between tre light and heavy vacuum cuts. As such, the information embodied in this signal is useful in determining the fine adjustments required in the various upstream processing equipment. Also, this information can be used to help in identifying the characteristics of the crude being processed so that the vacuum distillates or the atmospheric distillates can be segregated for selected products.

As an example of the latter use there is illustrated in FIG. 1 pneumatically operated by-pass valves 60, 61 and 62, respectively, connected in the conduits 20, 21 and 22 which respectively carry the light, intermediate, and heavy vacuum distillates. The signal corresponding to the average gravity-flash point characterization from the analog addition device 50 is carried by a conduit 63 to a sum comparator 64. A standard voltage source 65 is provided which generates a well regulated constant reference voltage. Connected with the standard voltage source 65 and the sum comparator 64 are high and low limit potentiometers, 66 and 67, which can be manually set to apply predetermined electrical upper and lower limit signals to the sum comparator 64. The manual settings used correspond to the predetermined upper and lower limits of the average gravity-flash point characterization signal defining a range of values of this characterization within which it is desired to segregate the product streams of the vacuum distillation unit for subsequent use thereof in the manufacture of a particular selected product. The sum comparator 64 includes conventional electronic circuitry for comparing the average gravity-flash point signal with the preset limit signals and further includes a switched output circuit for providing a D.C. signal when the average gravity-flash point signal is within the predetermined limits, the D.C. signal returning to zero when the predetermined limits are exceeded in either direction. This D.C. signal is carried by a conduit 68 to a normally closed solenoid valve 69.

The gravity-flash point characterization difference signal from the analog addition device 52, is carried by a conduit 70, to a difference comparator 71. Connected with the difference comparator 71 are high and low limit potentiometers, 72 and 73, which are in turn connected with the standard voltage source 65. The difference comparator 71 is essentially the same as the sum comparator 64 and provides a D.C. output signal the presence or absence of which is determined by the manual settings of the potentiometer 72 and 73. The signal from the difference comparator 71 is in turn carried by a conduit 74 to a normally closed solenoid valve 75. The potentiometers 72 and 73 are set to values defining minimum and maximum limits of the variation between the light and heavy vacuum distillates of their respective gravity-flash point characterizations. The significance of these settings includes their use in distinguishing between crudes processed, and in distinguishing between tolerable and intolerable variations of the gravity-flash point characterizations of the vacuum distillates when these distillates are to be segregated for subsequent use thereof in the manufacture of selected products.

A pneumatic pressure source 80 is provided to which are series connected the solenoid valves, 69 and 75, such that when both solenoid valves experience the presence of their input D.C. signals they open and permit the pneumatic pressure to pass. This pneumatic pressure is carried by a conduit 81 to the pneumatically operated by-pass valves 60, 61 and 62. Each of the latter valves is a two position by-pass valve which in the absence of a pneumatic signal permits passage of the respective vacuum distillate stream in the conduit to which it is coupled to a first exit port of the valve. When the valves are subjected to a pneumatic signal they switch to their respective second operative positions permitting fluid communication between their respective inlet conduits and second outlet ports thereof. The first outlet port of the valve 60 is connected to a conduit 82, the first outlet port of the valve 61 is connected to a conduit 83, and the first outlet port of the valve 62 is connected to a conduit 84. The second outlet port of the valve 60 is connected to a conduit 85, the second outlet port of the valve 61 is connected to a conduit 86, and the second outlet port of the valve 62 is connected to a conduit 87. Hence, when the valves 60, 61 and 62 are actuated to their second operative position by the concurrent occurrence of the predetermined values of the average and difference gravity-flash point characterization the three product streams of the vacuum distillation unit flow through the conduits 85, 86 and 87 and pass to a storage facility B not shown. The storage facility B constitutes a series of tanks wherein these products are stored for subsequent use in the manufacture of a selected product. When the valves 60, 61 and 62 are in their first operative position the vacuum distillation unit product streams pass through the conduits 82, 63 and 84 and thence to a storage facility A, not shown, wherein these products are stored for their normal i.e., non-select subsequent use.

An example of the application of the system follows.

In processing South Louisiana crudes it has been found that the gravity-flash product paraffinicity characterization varies in accordance with the following table.

EXAMPLE I

|  | Most paraffinic | Least paraffinic |
| --- | --- | --- |
| Gravity-flash point product (thousands): |  |  |
| Light vacuum distillate stream | 11.7 | 10.8 |
| Heavy vacuum distillate stream | 11.9 | 11.1 |
| Sum | 23.6 | 21.9 |
| Difference | −0.2 | −0.3 |

By experience it was found that the "most paraffinic" receipts are preferred for the manufacture of highly refined inhibited turbine oils because of their good refining yields and outstanding inhibitor response, whereas the "last paraffinic" are suitable for motor oil manufacture. In order to provide for a suitable segregation of the vacuum distillates for turbine oil manufacture the high and low limits of the comparator potentiometers are set as follows:

|  | High limit | Low limit |
| --- | --- | --- |
| Sum comparator | 27.0 | 22.7 |
| Difference comparator | −0.7 | 0.0 |

When the system of the invention detects product characteristics within these limits the characterization of the vacuum distillates correspond to that of the "most paraffinic" crude of this example. Hence, the vacuum distillate streams are automatically switched so as to collect the vacuum distillates in the storage facility B identified in this example to be turbine oil charge stock tankage. At other times the vacuum distillate products are collected in the storage facility A which in this example is identified as motor oil charge stock tankage. It should be noted that in this case the easily performed test on the crudes themselves, i.e. gravity, and viscosity, are too close together to permit positive identification:

|  | Most paraffinic | Least paraffinic |
| --- | --- | --- |
| Gravity, ° API | 36.6 | 37.7 |
| Viscosity, SUS at 180° F | 40.7 | 38.3 |

In this example the main reliance is placed on the sum to distinguish between the types of distillation products for segregation.

It can be appreciated by those skilled in the art that the characterization and the segregation of the distillates can be performed in a number of ways. Firstly, when crudes are processed which exhibit a relatively low variation of the gravity-flash point characterization with depth of distillation an adequate characterization and/or segregation, of the distillates, can be obtained by a gravity-flash point product determination performed on a single distillate stream such as the intermediate vacuum distillates. Secondly, when a crude is processed which exhibits appreciable variations of a gravity-flash point characterization with depth of distillation then it is preferred that the characterization, and/or segregation, be performed on the basis of the average gravity-flash point product of the light and heavy distillates as described above. Thirdly, when crudes are processed which are difficult to characterize without information of both the average gravity-flash point product, and information of the variation in paraffinicity with depths of distillation, then the preferred method of characterizing, and/or segregating, the distillates is to use the complete scheme of the invention as discussed above. In each of the first two instances appropriate omissions of some of the equipment items discussed in reference to FIG. 1 can be made.

Referring now to FIG. 2, which illustrates an alternate use of the system illustrated in FIG. 1, the equipment items to which are applicable the descriptions thereof provided in reference to FIG. 1 are shown with the same identifying numeral utilized in FIG. 1. Also, the region in the field of the drawings which differ are identified by the block C shown on both figures of the drawings. The solenoid valves 69 and 75 shown in FIG. 2 operate in response to the comparators, 64 and 71, receiving the average and difference gravity-flash point characterization signals which are generated as discussed above. The pneumatic signal from the solenoid valves, 69 and 75, is carried by the conduit 81 to a single pneumatically operated by-pass valve 90 which in this figure of the drawings is connected to the conduit 13 for segregation of the kerosene atmospheric fraction carried by the conduit 13. When the gravity-flash point characterization signals are within the predetermined limits set into the comparators 64 and 71 by settings of the potentiometers 66, 67, 72, and 73, the solenoid valves 69 and 75 are caused to open by their respective input control signals from the comparators. The pneumatic by-pass valve 90, is essentially the same as the valves 60–62, described in reference to FIG. 1, and when it receives a pneumatic signal through the conduit 81 it switches from its first operative position to its second operative position. In its first operative position it permits fluids communication from its first inlet port, connected with the conduit 13, to a first outlet port which is, in turn, connected with a conduit 91 which carries the kerosene fraction to a storage facility A. When the valve 90 is in its second operative position it permits fluid communication between its inlet port and its second outlet port which is, in turn, connected to a conduit 92 which carries the kerosene fraction to a storage facility B.

FIG. 2 of the drawings indicates that one or more fractions of the atmospheric distillation units may be characterized or segregated in response to on-stream characterization measurements of the vacuum distillate streams. A specific example follows.

EXAMPLE II

In this example West Texas crudes are being processed. In this instance, as in Example I, conventional tests on the crudes produce very close results so that they cannot accurately distinguish between two particular Texas crudes, thus:

|  | Crude 1 | Crude 2 |
| --- | --- | --- |
| Gravity, °API | 41.0 | 41.5 |
| Viscosity, SUS at 130° F | 34.1 | 33.5 |

It has been found that crude 1 is preferred as a source of aviation jet fuel. The gravity-flash point characterization instrumentation on the vacuum tower product streams shows the following results:

|  | Crude 1 | Crude 2 |
| --- | --- | --- |
| Gravity flash products (thousands): |  |  |
| Light vacuum distillate | 11.8 | 11.3 |
| Heavy vacuum distillate | 12.3 | 12.1 |
| Sum | 24.1 | 23.4 |
| Difference | −0.5 | −0.8 |

In this example in order to select and segregate the atmospheric distillates from crude 1 for jet fuel the following are the settings required of the comparator potentiometers:

|  | High limit | Low limit |
| --- | --- | --- |
| Sum comparator | 27.0 | 23.7 |
| Difference comparator | −0.7 | 0.0 |

In this example both the sum and difference valves of the gravity-flash point characterization are used. When the signals are within the specified ranges the atmospheric kerosene cut is segregated to pass through the conduit 92 to the storage facility B, by automatic operation of the valve 90, to its second operative position, in response to the pneumatic signal in the conduit 81.

It can be appreciated by those skilled in the art that the various signal carrying conduits can be either electrical wiring, pneumatic signal carrying tubing, or mechanical linkages, depending upon the type of computation elements used. The computation elements can take the form of electrical analog computing elements, mechanical computing devices, electronic digital computing elements, or pneumatic computing elements. The use of analog computing elements is deemed preferable. It can be appreciated by those skilled in the art, however, that should a digital computer be utilized for overall process control that it may readily be programmed to perform the computation steps associated with the invention. Such an embodiment would offer all of the advantages inherent in digital computation and control such as speed and accuracy.

While the invention has been described with a certain degree of particularity, it can, nevertheless, be seen by the examples hereinabove set forth that many modifications and variations of the invention may be made without departing from the spirit thereof.

I claim:
1. A method for characterizing a hydrocarbon mixture in accordance with the relative paraffinicity thereof by providing a signal representative of said paraffinicity, wherein said paraffinicity is related to the API gravity and the flash point of said hydrocarbon mixture comprising the steps of:
(a) sensing a physical property of said hydrocarbon mixture representative of the flash point thereof and providing a flash point first signal corresponding thereto;
(b) sensing a physical property of said hydrocarbon mixture representative of the specific gravity thereof and providing a specific gravity second signal corresponding thereto;
(c) generating a third signal corresponding to the API gravity of said mixture by generating said third signal in response to said specific gravity second signal and in accordance with a predetermined relationship relating said API gravity with said specific gravity; and
(d) generating a product fourth signal corresponding to the product of said flash point first signal and said API gravity third signal said fourth signal thereby characterizing said hydrocarbon mixture by being representative of the paraffinicity thereof.

2. The method of claim 1 wherein said third signal generating step (c) comprises:
(c) generating a third signal corresponding to the API gravity of said mixture by generating said third signal in response to said specific gravity second signal substantially in accordance with the following relationship:

$$°API = \frac{C_1}{S_g} - C_2$$

where:

$S_g$ is proportional to said specific gravity second signal
$C_1$ = a constant having a value of about 141.5, and
$C_2$ = a constant having a value of about 131.5, 3. In association with a hydrocarbon refining process wherein a hydrocarbon mixture is refined to provide at least two fractions thereof, a first fraction and a second fraction, said second fraction being a cut heavier than said first fraction, a method for characterizing said hydrocarbon mixture and said fractions thereof in accordance with the relative paraffinicity thereof by providing a signal representative of said paraffinicity, comprising the steps of:
(a) sensing a physical property of said first fraction related to the flash point thereof and providing a flash point first signal representative thereof;
(b) sensing a physical property of said first fraction related to the API gravity thereof and providing a gravity related second signal representative thereof;
(c) generating a fourth signal representative of the product of said flash point first signal and said gravity related second signal, said fourth signal being representative of the paraffinicity of said first fraction;

(d) sensing a physical property of said second fraction related to the flash point thereof and providing a flash point fifth signal representative thereof;

(e) sensing a physical property of said second fraction related to the API gravity thereof and providing a gravity related sixth signal representative thereof;

(f) generating a seventh signal representative of the product of said flash point fifth signal and said gravity related sixth signal said seventh signal being representative of the paraffinicity of said second fraction; and (g) generating an average paraffinicity eighth signal representative of the average of said fourth and seventh signals, whereby said eighth signal is representative of the average paraffinicity of said hydrocarbon mixture over a range of cuts including said first and second fractions.

4. The method of claim 3 wherein said step (b) comprises the steps of:

(ba) sensing a physical property of said first fraction representative of the specific gravity thereof and providing a specific gravity third signal corresponding thereto; and (bb) generating a second signal corresponding to the API gravity of said first fraction by generating said second signal in response to said specific gravity third signal and in accordance with a predetermined relationship relating said API gravity with said specific gravity;

and wherein said step (e) comprises the steps of:

(ea) sensing a physical property of said second fraction representative of the specific gravity thereof and providing a specific gravity ninth signal corresponding thereto; and (eb) generating a sixth signal corresponding to the API gravity of said second fraction by generating said sixth signal in response to said ninth signal and in accordance with a predetermined relationship relating said API gravity with said specific gravity;

whereby said second and sixth signals correspond to the API gravity of said first and second fraction, respectively.

5. The method of claim 4 wherein said step (a) comprises:

(a) sensing the Cleveland Open Cup flash point of said first fraction and providing a flash point first signal corresponding thereto;

and wherein said said step (d) comprises:

(d) sensing the Cleveland Open Cup flash point of said second fraction and providing a flash point second signal corresponding thereto;

whereby said fourth and seventh signals correspond to the product of the API gravity and the Cleveland Open Cup flash point of said first and second fractions, respectively.

6. In association with a hydrocarbon refining process wherein a hydrocarbon mixture is refined to provide a stream of at least one hydrocarbon product mixture a method for segregating said product mixture in accordance with the paraffinicity thereof comprising the steps of:

(a) sensing a physical property of said product mixture representative of the flash point thereof and providing a flash point first signal corresponding thereto;

(b) sensing a physical property of said product mixture representative of the specific gravity thereof and providing a specific gravity second signal corresponding thereto;

(c) generating a third signal corresponding to the API gravity of said product mixture by generating said third signal in response to said specific gravity second signal and in accordance with a predetermined relationship relating said API gravity with said specific gravity;

(d) generating a product fourth signal corresponding to the product of said flash point first signal and said API gravity third signal said fourth signal thereby characterizing said hydrocarbon product mixture, and (e) segregating said product mixture in response to said fourth signal by causing said stream thereof to pass into a first receptacle when said fourth signal is less than a predetermined value thereof and causing said stream of said product mixture to pass into a second receptacle when said fourth signal exceeds a predetermined value thereof.

7. In association with a hydrocarbon refining process wherein a hydrocarbon mixture is refined to provide at least two fractions, a first fraction and a second fraction, said second fraction being a cut heavier than said first fraction, a method for segregating at least one of said fractions in accordance with the average paraffinicity of said hydrocarbon mixture comprising the steps of claim 3 and further comprising the step of:

(h) segregating at least one of said fractions in response to said average paraffinicity eighth signal by causing a stream thereof to pass into a first receptacle when said eighth signal is less than a predetermined value thereof and causing said stream to pass into a second receptacle when said eighth signal exceeds said predetermined value thereof.

8. In association with a hydrocarbon refining process including a vacuum distillation process wherein a hydrocarbon mixture comprising a reduced petroleum crude is refined to provide at least two vacuum fractions, a first fraction and a second fraction, said second fraction being a vacuum fraction heavier than said first fraction, a method for segregating at least one of said fractions in accordance with the relative paraffinicity of said hydrocarbon mixture, comprising the steps of claim 3 and further comprising the steps of:

(h) generating a paraffinicity difference tenth signal representative of the difference between said product fourth signal and said product seventh signal whereby said tenth signal is representative of the difference of paraffinicity of said first and second fractions; and (i) segregating at least one of said fractions in response to said average paraffinicity eighth signal and said paraffinicity difference tenth signal by causing a stream of said fraction being segregated to pass into a first receptacle when the values of said eighth and tenth signals are such that the value of said average paraffinicity eighth signal is within a predetermined range defined by a predetermined upper and lower limit thereof and the value of said paraffinicity difference tenth signal is within a predetermined range defined by a predetermined upper and lower limit thereof.

9. In association with a hydrocarbon refining process including an atmospheric distillation process and a vacuum distillation process wherein a petroleum hydrocarbon mixture is refined by said atmospheric distillation process to provide at least two atmospheric fractions, wherein one of said atmospheric fractions is further refined by said vacuum distillation process to provide at least two vacuum distilled fractions, a first fraction and a second fraction, said second fraction being a vacuum fraction heavier than said first fraction, a method for segregating at least one of said atmospheric fractions in accordance with the relative paraffinicity of said further refined atmospheric fraction, comprising the steps of claim 3 and further comprising the steps of:

(h) generating a paraffinicity difference tenth signal representative of the difference between said product fourth signal and said product seventh signal whereby said tenth signal is representative of the difference of paraffinicity of said first and second fractions; and (i) segregating at least one of said atmospheric fractions in response to said average paraffinicity eighth signal and said paraffinicity difference tenth signal by causing a stream of said atmospheric fraction being segregated to pass into a first receptacle when the values of said eighth and tenth signals are such that the value of said average paraffinicity eighth signal is within a predetermined range defined by a predetermined upper and lower limit thereof and the value of said paraffinicity difference tenth signal is within a predetermined range defined by a predetermined upper and lower limit thereof.

10. Apparatus for characterizing a hydrocarbon mixture from a source thereof in accordance with the relative paraffinicity of said hydrocarbon mixture wherein said paraffinicity is related to the API gravity and the flash point of said hydrocarbon mixture comprising:

(a) means, connected with said source of said hydrocarbon mixture, for sensing a physical property of said mixture representative of the flash point thereof and for providing a flash point first signal corresponding thereto;

(b) means, connected with said source of said hydrocarbon mixture, for sensing a physical property of said mixture representative of the specific gravity thereof and for providing a specific gravity second signal corresponding thereto;

(c) means, connected with said physical property sensing means (b), for generating a third signal corresponding to the API gravity of said mixture by generating said third signal in response to said specific gravity second signal and in accordance with a predetermined relationship relating said API gravity with said specific gravity; and (d) means, connected with said physical property sensing means (a) and connected with said signal generating means (c), for generating a product fourth signal corresponding to the product of said flash point first signal and said API gravity third signal said fourth signal thereby characterizing said hydrocarbon mixture by being representative of the paraffinicity thereof.

11. An apparatus according to claim 10 wherein said physical property sensing means (a) and said product fourth signal generating means (d) are respectively adapted to provide said first and fourth signals as electrical signals, wherein said physical property sensing means (b) comprises:

(b) means including a specific gravity analyzer connected with said source of said hydrocarbon mixture, for sensing the specific gravity thereof, and for providing a specific gravity electrical second signal corresponding thereto;

and wherein said signal generating means (c) comprises:

(c) electrical computing and signal generating means connected with said specific gravity analyzing means (b) for generating an API gravity electrical third signal of said hydrocarbon mixture by generating said third signal in response to said specific gravity second signal and in accordance with a predetermined relationship relating said API gravity with said specific gravity;

whereby said product fourth signal representative of the paraffinicity of said hydrocarbon mixture is provided as an electrical signal.

12. In connection with a distillation unit wherein a hydrocarbon mixture is refined to provide at least two fractions thereof, a first fraction and a second fraction, said second fraction being a cut heavier than said first fraction, apparatus for characterizing said hydrocarbon mixture in accordance with the relative paraffinicity thereof, by providing a signal representative of said paraffinicity, comprising:

(a) means, operatively coupled with said distillation unit, for sensing a physical property of said first fraction representative of the flash point thereof and for providing a flash point first signal corresponding thereto;

(b) means, operatively coupled with said distillation unit, for sensing a physical property of said first fraction representative of the API gravity thereof and for providing an API gravity second signal corresponding thereto;

(c) means, coupled with said flash point first signal providing means (a) and coupled with said API gravity second signal providing means (b), for generating a product fourth signal corresponding to the product of said flash point first signal and said API gravity second signal, said fourth signal being representative of the paraffinicity of said first fraction;

(d) means, operatively coupled with said distillation unit, for sensing a physical property of said second fraction representative of the flash point threeof and for providing a flash point fifth signal corresponding thereto;

(e) means, operatively coupled with said distillation unit, for sensing a physical property of said second fraction representative of the API gravity thereof and for providing an API gravity sixth signal corresponding thereto;

(f) means, coupled with said flash point fifth signal providing means (d) and coupled with said API gravity sixth signal providing means (e) for generating a product seventh signal corresponding to the product of said flash point fifth signal and said API gravity sixth signal, said seventh signal being representative of the paraffinicity of said second fraction; and (g) means for generating an average paraffinicity eighth signal representative of the average of said fourth and seventh signals, whereby said eighth signal is representative of the average paraffinicity of said hydrocarbon mixture over a range of cuts including said first and second fractions.

13. In connection with a distillation unit wherein a hydrocarbon mixture is refined to provide at least two fractions thereof, a first fraction and a second fraction, said second fraction being a cut heavier than said first fraction, apparatus for segregating at least one of said fractions in accordance with the relative paraffinicity of said hydrocarbon mixture comprising the apparatus of claim 12 and further comprising:

(h) means, coupled with said product fourth signal generating means (c) and coupled with said product seventh signal generating means (f), for generating a paraffinicity difference tenth signal corresponding to the difference between said product fourth signal and said product seventh signal whereby said tenth signal is representative of the difference of paraffinicity of said first and second fractions; and (i) segregating means, coupled with said average paraffinicity eighth signal generating means (g), coupled with said paraffinicity difference tenth signal generating means (h), and coupled with said distillation unit, for segregating at least one of said fractions in response to said average paraffinicity eighth signal and said paraffinicity difference tenth signal by causing a stream of said fraction being segregated to pass into a first receptacle when the values of said eighth and tenth signals are such that the value of said average paraffinicity eighth signal is within a predetermined range defined by a predetermined upper and lower limit thereof and the value of said paraffinicity difference tenth signal is within a predetermined range defined by a predetermined upper and lower limit thereof.

14. In connection with a hydrocarbon refining facility including an atmospheric distillation unit and a vacuum distillation unit wherein a petroleum hydrocarbon mixture is refined by said atmospheric distillation unit to provide at least two atmospheric fractions, wherein one of said atmospheric fractions is further refined by said vacuum distillation unit to provide at least two vacuum distilled fractions, a first fraction and a second fraction, said second fraction being a vacuum fraction heavier than said first fraction, apparatus for segregating at least one of said atmospheric fractions in accordance with the relative paraffinicity of said further refined atmospheric fraction comprising the apparatus of claim 12 and further comprising:

(h) means, coupled with said product fourth signal generating means (c) and coupled with said product seventh signal generating means (f), for generating a paraffinicity difference tenth signal corresponding to the difference between said product fourth signal and said product seventh signal whereby said tenth signal is representative of the difference of paraffinicity of said first and second fractions; and (i) segregating means coupled with said average paraffinicity eighth signal generating means (g), coupled with said paraffinicity difference tenth signal generating means (h), and coupled with said atmospheric distillation unit, for segregating at least one of said atmospheric fractions in response to said average paraffinicity eighth signal and said paraffinicity difference tenth signal by causing a stream of said atmospheric fraction being segregated to pass into a first receptacle when the value of said average paraffinic eighth signal is within a predetermined range defined by a predetermined upper and lower limit thereof and the value of said paraffinicity difference tenth signal is within a predetermined range defined by a predetermined upper and lower limit thereof.

References Cited

UNITED STATES PATENTS

| | | | |
|---|---|---|---|
| 2,893,927 | 7/1959 | Mertz et al. | 196—132 |
| 2,976,234 | 3/1961 | Webber | 196—132 |
| 3,025,232 | 3/1962 | Jones | 196—132 |
| 3,156,628 | 11/1964 | Larrison | 202—40 |
| 3,285,846 | 11/1966 | King et al. | 208—28 |
| 3,428,527 | 2/1969 | Rijnsdorp et al. | 196—132 |
| 3,458,432 | 7/1969 | Woodle et al. | 208—36 |

HERBERT LEVINE, Primary Examiner

U.S. Cl. X.R.

23—230, 253; 73—32; 196—132; 235—151.12, 151.13